UNITED STATES PATENT OFFICE.

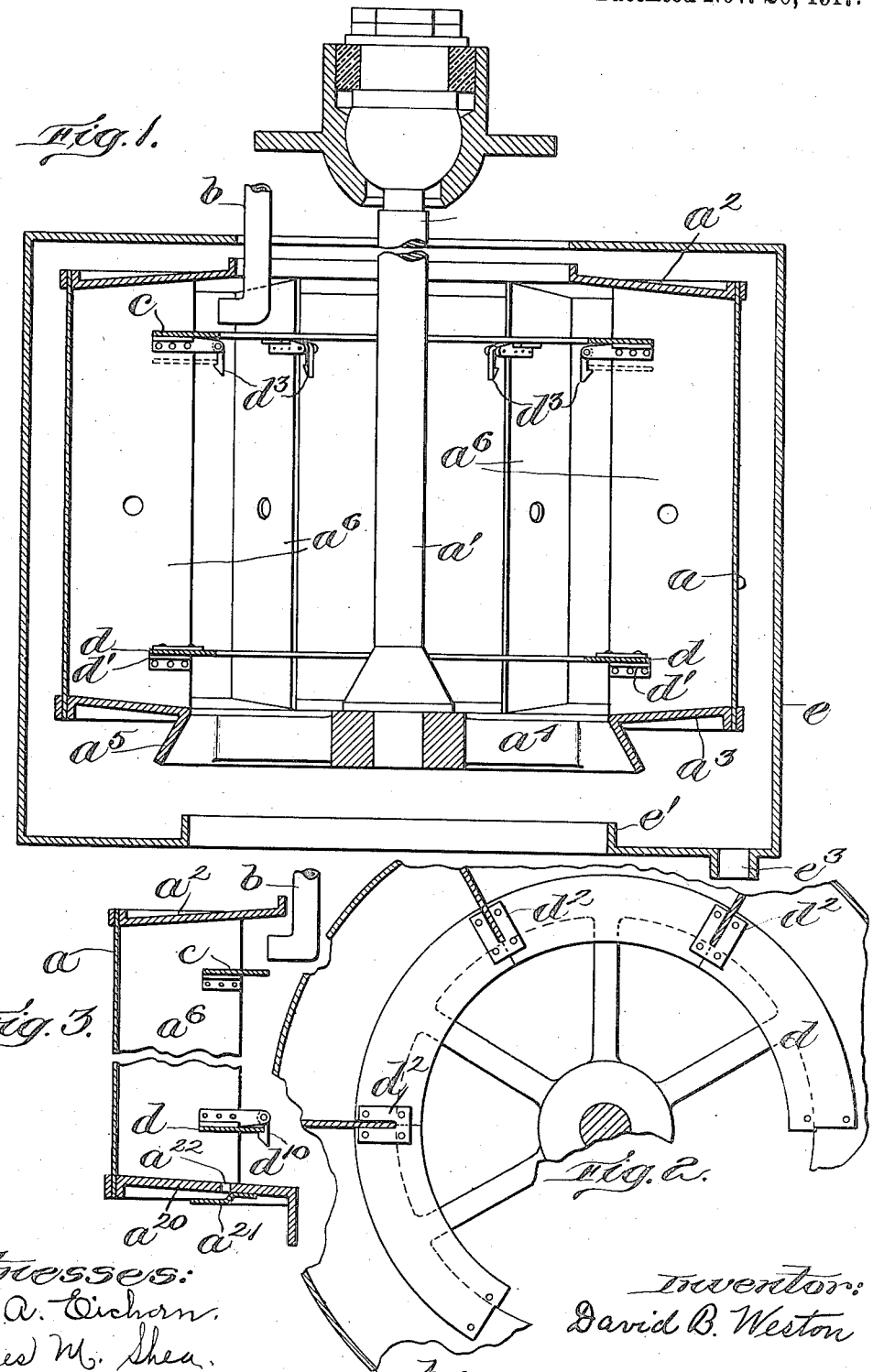

DAVID B. WESTON, OF SHARON, MASSACHUSETTS.

CENTRIFUGAL SEPARATOR.

1,247,472.　　　　　Specification of Letters Patent.　　Patented Nov. 20, 1917.

Application filed November 15, 1913. Serial No. 801,154.

*To all whom it may concern:*

Be it known that I, DAVID B. WESTON, citizen of the United States, and resident of Sharon, county of Norfolk, State of Massachusetts, have invented certain new and useful Improvements in Centrifugal Separators, of which the following is a specification.

This invention relates to centrifugal separators and is intended to provide an efficient construction capable of practical use in continuously separating a solid constituent suspended in the liquid, so that the device may be capable of doing the work commonly done by the more cumbersome filter presses without being subject to the clogging which is incident to the use of filter presses.

In general the invention comprises a rotary centrifugal receptacle whose top and bottom respectively are provided with inlet and outlet openings, combined with means for introducing the liquid to be treated into the upper peripheral portion of the receptacle, and means for permitting the discharge of the clarified juice, while retaining in the receptacle the solid content and the unclarified liquid.

The machine is especially adapted for use in extracting the sediment or dirt from cane juice and also treating sewage, sludge or other like substances.

In the accompanying drawings I have illustrated a convenient means of embodying the principles of this invention in which:—

Figure 1 is a vertical central section;

Fig. 2 is a plan view showing the bottom of the receptacle and the baffle plate; and Fig. 3 is a detail view in elevation showing a modified form of construction.

I have shown the invention applied to the ordinary suspended type of gyratory receptacle, in which the receptacle $a$ is secured to a central gyratory rotary shaft $a'$. The top $a^2$ of the receptacle is of annular form to cover the peripheral portion of the receptacle leaving the center open. The bottom $a^3$ of the receptacle is also of annular form, serving to close the peripheral portion and rests upon a central spider $a^4$ which occupies the central opening, leaving spaces between its arms for the escape of the clarified juice, when the machine is running, and for the discharge of the solid matter when the machine is stopped. The bottom is preferably provided, adjacent to the central opening, with an outwardly and downwardly flared lip or flange $a^5$. A series of vertical radial wings $a^6$ insure high speed rotation of the liquid content.

The liquid to be treated is introduced through the opening in the top of the receptacle by means of a supply pipe $b$ arranged to deliver the liquid toward the outer, upper portion of the receptacle. To further insure the movement of the inflowing liquid to the peripheral wall of the receptacle, I provide in the upper portion of the receptacle, adjacent to the inlet pipe, an annular deflector plate $c$, whose outer edge is separated a substantial distance from the peripheral wall of the receptacle. To prevent the possibility of any unclarified liquid from passing directly to the outlet in the bottom, I provide an annular baffle plate $d$ which extends inwardly beyond the periphery of the outlet opening in the bottom, so that all liquid escaping through the bottom of the receptacle must pass around the outside of the baffle plate, between the latter and the outside wall. The flange $a^5$ being flared outwardly allows the escaping liquid to pass outside of the retaining flange $e'$ of the surrounding curb or casing $e$, and also allows the flange or lip $e'$ to be located slightly outside of the inner edge of the bottom $a^3$ bounding the discharge opening.

The annular plate $d$ rests upon angle plates or ledges $d'$ secured in pairs on opposite sides of the wings $a^6$. As shown in Fig. 2, the baffle plate $d$ is made with radial slots extending inward from its outer edge to receive the inwardly projecting portions of the wings. For convenience in manufacture, the baffle plate is made in segmental sections which are bolted together by means of slotted fish plates $d^2$, after the sections have been placed in position.

Since the baffle plate in its normal operative position would interfere with the discharging of the solid matter through the bottom, it rests removably upon the ledges $d'$ and may be raised to a position immediately beneath the deflector $c$, where hooks $D^3$ are provided for detachably supporting it out of the way.

In practice after the machine has been started, the liquid to be treated is admitted through the supply pipe $b$ and flows directly toward the upper part of the peripheral wall, over which it accumulates in a vertical layer. The centrifugal force throws the heavy solid content toward the outer wall, and when a sufficient amount of liquid has accumulated to fill the annular space above the annular bottom, the light or clarified liquid begins to escape between the arms of the spider $a^4$, and owing to the centrifugal force, falls in the direction indicated by the arrow, outside of the flange $e'$ of the curb. This operation continues until the solid matter has accumulated to the capacity of the machine, when the machine is stopped, the baffle plate $d$ is raised to inoperative position beneath the deflector and the attendant scoops out the solid matter which falls through the central opening in the curb $e'$ to any suitable receptacle beneath. The clarified liquid is drawn off through the outlet $e^3$ of the curb.

In Fig. 3, I have shown a modified arrangement in which the bottom or floor $a^{20}$ of the receptacle is provided with a series of small apertures $a^{22}$ forming outlets for the clarified liquid below the baffle plate $d$. The line of these outlet holes may be covered by a deflector or guard $a^{21}$ arranged so as to throw into the outer casing or curb, the escaping liquid. In this case, the baffle plate $d$ is detachably suspended by means of hooks $d^{10}$ so that when it is desired to discharge the solid matter, the baffle plate may be dropped upon the bottom $a^{20}$ by releasing the hooks $d^{10}$, and in this position cover the liquid outlet holes and prevent their being clogged when the solid matter is scraped down from the vertical wall toward the central opening in the receptacle.

What I claim is:

1. The combination of the centrifugal receptacle having an imperforate outer wall provided with openings at top and bottom, a series of vertical wings arranged in the peripheral portion of the receptacle, an inlet pipe arranged to deliver the liquid to be treated into the upper peripheral portion of the receptacle, an annular deflector plate arranged in the upper peripheral portion of the receptacle, a baffle plate arranged in the lower portion of the receptacle with its inner edge projecting inwardly beyond the outlet opening in the bottom, said baffle plate being removable from its operative position in the bottom portion of the receptacle, and means for detachably supporting said baffle plate in the upper portion of said receptacle in order to facilitate the discharge of the solid matter through the bottom of the receptacle, substantially as described.

2. The combination of a centrifugal receptacle provided with top and bottom openings, a series of vertical wings arranged in the peripheral portion of said receptacle, an annular baffle plate provided with slots extending inwardly from its outer edge to receive the vertical wings, said baffle plate comprising a series of segmental sections and a series of fish plates by which they are joined together, said baffle plate being removable vertically from operative to inoperative position, substantially as described.

3. In a centrifugal machine the combination of a rotary receptacle comprising a peripheral wall and annular top and bottom members projecting inwardly from said wall to leave large central openings, an annular baffle plate arranged in the upper peripheral portion of the receptacle adjacent to the top and some distance from the peripheral wall so as to leave an annular clearance space between itself and the wall, a liquid supply pipe arranged to deliver liquid to be clarified between the annular top and said baffle plate, said baffle plate being disposed with its outer and inner edges respectively, extending beyond the line of axial continuation or projection of the discharge opening in the bottom, substantially as described.

4. In a centrifugal separator the combination of a rotary receptacle comprising a peripheral wall and annular top and bottom members secured thereto and projecting inwardly therefrom to leave large central openings, a liquid supply pipe projected through the top opening with its delivery portion arranged to project beneath the top so as to feed the liquid into the upper peripheral portion of the receptacle, a series of wings arranged in the peripheral zone of the receptacle to project inwardly from the peripheral wall, a baffle ring arranged in the peripheral portion of the receptacle but at a distance from the peripheral wall so as to leave an annular clearance space, the inner edge of said receptacle being extended inwardly beyond the axial projection or continuation of the edge of the discharge outlet in the bottom, substantially as described.

5. In a centrifugal separator the combination of a rotary receptacle comprising a peripheral wall with top and bottom annular members projecting inwardly therefrom to leave large central openings, upper and lower baffle rings mounted in a peripheral portion of the receptacle so as to leave annular clearance spaces between their outer edges and the peripheral walls of the receptacle, the inner edges of said baffle rings being located inside the axial projection of the edge of the discharge opening in the bottom, substantially as described.

6. In a centrifugal separator the combination of a rotary receptacle comprising a peripheral wall, annular top and bottom members secured to said wall to leave large central openings, upper and lower baffle rings arranged in the peripheral portion of the receptacle so as to leave annular clearance spaces between their outer edges and the peripheral wall, a series of vertical wings arranged in the peripheral portion of the receptacle, said baffle rings having their inner edges extending inside the line of the edge of the discharge opening in the bottom, the lower wing being movable from operative position in the bottom portion of the receptacle to inoperative position in the upper portion of the receptacle, and means for supporting the lower ring in said inoperative position for the purpose of facilitating the discharge of the solid contents, substantially as described.

7. In a centrifugal separator the combination of a rotary centrifugal receptacle comprising an imperforate peripheral wall and annular top and bottom members secured thereto and leaving large central openings, a supply pipe arranged to deliver the liquid directly into the upper peripheral portion of the receptacle, a baffle ring arranged in the peripheral portion of the receptacle to leave an outer clearance space between itself and the peripheral wall, the inner edge of said baffle ring being located nearer the center of the receptacle than the edge of the outlet opening in the bottom, a surrounding curb provided with a large central opening and an upwardly extending flange around said opening substantially in alinement with the discharge opening in the bottom of the rotary receptacle whereby the clarified liquid escaping through the bottom orifice will pass outside of said flange in the curb when the machine is operating at normal speed while permitting the discharge of the solid content from the basket during the discharge operation through the central opening in the bottom of said curb, substantially as described.

In witness whereof, I have subscribed the above specification.

DAVID B. WESTON.

In the presence of—
GEORGE A. ROCKWELL,
GEO. N. GODDARD.